United States Patent
Hoydis et al.

(10) Patent No.: US 11,695,202 B2
(45) Date of Patent: Jul. 4, 2023

(54) CONTROLLING RADIATING ELEMENTS

(71) Applicant: Nokia Technologies Oy, Espoo (FI)

(72) Inventors: Jakob Hoydis, Paris (FR); Faycal Ait Aoudia, Saint-Cloud (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 185 days.

(21) Appl. No.: 17/252,074

(22) PCT Filed: Jul. 13, 2018

(86) PCT No.: PCT/EP2018/069078
§ 371 (c)(1),
(2) Date: Dec. 14, 2020

(87) PCT Pub. No.: WO2020/011368
PCT Pub. Date: Jan. 16, 2020

(65) Prior Publication Data
US 2021/0328341 A1    Oct. 21, 2021

(51) Int. Cl.
*H01Q 3/01* (2006.01)
*H01Q 1/22* (2006.01)
(Continued)

(52) U.S. Cl.
CPC ............ *H01Q 3/01* (2013.01); *H01Q 1/246* (2013.01); *H01Q 21/061* (2013.01)

(58) Field of Classification Search
CPC ............ H01Q 1/246; H01Q 3/01; H01Q 3/02; H01Q 3/04; H01Q 3/12; H01Q 21/026; H01Q 1/22; H04B 1/00
See application file for complete search history.

(56) References Cited

U.S. PATENT DOCUMENTS

| 5,969,689 A | * | 10/1999 | Martek | H01Q 1/42 343/758 |
| 8,643,559 B2 | * | 2/2014 | Deng | H01Q 3/02 343/839 |

(Continued)

OTHER PUBLICATIONS

Sutton et al., "Policy Gradient Methods for Reinforcement Learning with Function Approximation", Proceedings of the 12th International Conference on Neural Information Processing Systems, Nov. 1999, pp. 1057-1063.

(Continued)

*Primary Examiner* — Blane J Jackson
(74) *Attorney, Agent, or Firm* — Squire Patton Boggs (US) LLP

(57) ABSTRACT

An apparatus, method and computer program product is disclosed. The apparatus may comprise means for receiving a performance metric for an antenna array comprised of a plurality of radiating elements, the performance metric being based on performance data associated with the antenna array, the antenna array having a radiating configuration represented by configuration parameters. The apparatus may also comprise means for updating the configuration parameters dependent on the received performance metric by means of estimating new configuration parameters for moving the performance metric towards a target value. The apparatus may also comprise means for re-configuring the radiating configuration of the antenna array based on the updated configuration parameters such that the physical geometry of the antenna array is changed.

18 Claims, 8 Drawing Sheets

(51) Int. Cl.
*H01Q 1/24* (2006.01)
*H01Q 21/06* (2006.01)

(56) References Cited

U.S. PATENT DOCUMENTS

| 10,079,431 | B2* | 9/2018 | Deng ................ H01Q 3/16 |
| 2013/0143592 | A1 | 6/2013 | Brisebois et al. |
| 2013/0331079 | A1 | 12/2013 | Racz et al. |
| 2016/0162783 | A1 | 6/2016 | Tan et al. |
| 2016/0165462 | A1* | 6/2016 | Tan ................ H04W 16/10 370/254 |
| 2016/0165472 | A1 | 6/2016 | Gopalakrishnan et al. |
| 2018/0175498 | A1* | 6/2018 | Kurniawan ............ H01Q 3/005 |

OTHER PUBLICATIONS

Dandanov et al., "Dynamic Self-optimization of the Antenna Tilt for Best Trade-off Between Coverage and Capacity n Mobile Networks", Wireless Personal Communications, vol. 92, Oct. 27, 2016, 28 pages.

Moghaddam et al., "Joint Tilt Angle Adaptation and Beamforming in Multicell Multiuser Cellular Networks", arXiv, Jan. 13, 2017, pp. 1-20.

Pedras et al., "Antenna Tilt Optimization Using a Novel QoE Model Based on 3G Radio Measurements", The 20th International Symposium on Wireless Personal Multimedia Communications (WPMC2017), Dec. 17-20, 2017, pp. 124-130.

Guo et al., "Spectral- and Energy-efficient Antenna Tilting in a Hetnet Using Reinforcement Learning", IEEE Wireless Communications and Networking Conference (WCNC), Apr. 7-10, 2013, pp. 1-6.

Christodoulou et al., "The Use of Machine Learning in Smart Antennas", IEEE Antennas and Propagation Society Symposium, Jun. 20-25, 2004, pp. 321-324.

International Search Report and Written Opinion received for corresponding Patent Cooperation Treaty Application No. PCT/EP2018/069078, dated Mar. 29, 2019, 14 pages.

Zhang et al., "Machine Learning for Predictive On-Demand Deployment of UAVs for Wireless Communications", arXiv, Apr. 30, 2018, 6 pages.

Office action received for corresponding European Patent Application No. 18746851.7, dated Jul. 27, 2022, 6 pages.

* cited by examiner

CONTROLLING RADIATING ELEMENTS

RELATED APPLICATION

This application claims priority to PCT Application No. PCT/EP2018/069078, filed on Jul. 13, 2018, which is incorporated herein by reference in its entirety.

FIELD

Example embodiments relate to methods, systems and computer programs for controlling one or more radiating elements, for example the radiating elements of one or more antennas which may form part of an antenna array.

BACKGROUND

An antenna may comprise one or more radiating elements which are fed with the same radio frequency signal. An antenna array may comprise multiple such antennas with individual radio frequency chains. Antenna arrays are used for various purposes, for example for beamforming in telecommunications networks. Radiating elements may also be used for receiving radio frequency energy.

SUMMARY

A first aspect may provide an apparatus, comprising: means for receiving a performance metric for an antenna array comprised of a plurality of radiating elements, the performance metric being based on performance data associated with the antenna array, the antenna array having a radiating configuration represented by configuration parameters; means for updating the configuration parameters dependent on the received performance metric by means of estimating new configuration parameters for moving the performance metric towards a target value; means for re-configuring the radiating configuration of the antenna array based on the updated configuration parameters such that the physical geometry of the antenna array is changed.

The re-configuring means may be configured to change the physical geometry by moving one or more radiating elements based on the re-configured configuration.

The updating means may be further configured to iteratively update the configuration parameters dependent on received performance metrics resulting from the updated configuration parameters, until a stop condition is reached.

The stop condition may correspond to a fixed number of update iterations.

The stop condition may correspond to the performance metric reaching the target value. The stop condition may correspond to a fixed number of update iterations for which the performance metric does not move towards the target value.

The updating means may comprise a machine learning model configured to estimate, based on stored training data, updated configuration parameters likely to move the performance metric towards the target value. The machine learning model may be trained with data derived from initial connections quality and subsequently updating the model based on the results caused by the updated configuration parameters. The machine learning model may be trained with initial configuration parameters and subsequently updated based on the results of re-configurations caused by the updated configuration parameters. The machine learning model may be trained from a digital sibling.

The performance metric may be received from a computing means configured to receive performance data from a physical node of at least part of a communications network with which the antenna array forms part.

The computing means may be associated with a base station of at least part of a cellular communications network with which the antenna array forms part.

The performance metric may be received from a simulation means which simulates a physical node of at least part of a communications network with which the antenna array forms part.

The simulated physical node may be associated a base station of at least part of a cellular communications network with which the antenna array forms part.

The computing or simulation means may comprise a part of the apparatus.

The received performance metric may represent the measured or simulated value of one or more of data throughput, call drop rate, outage probability and energy consumption associated with the antenna array.

The performance metric may represent said measured or simulated values for each of a different number of user equipment within a cell of a cellular communications system associated with the antenna array.

The configuration parameters may comprise one or more of, for a $j^{th}$ radiating element of an $i^{th}$ antenna of the antenna array:

| | |
|---|---|
| Position | $x_{i,j} \in \mathbb{P}_{i,j} \subset \mathbb{R}^3$ |
| Azimuth angle | $\varphi_{i,j} \in [0, 2\pi]$ |
| Elevation angle | $\theta_{i,j} \in [-\pi/2, \pi/2]$ |
| Analog phase shift | $\beta_{i,j} \in [-\pi, \pi]$ |
| Analog signal gain | $\alpha_{i,j} \in [\alpha_{min}, \alpha_{max}]$ | and the means for re-configuring the radiating configuration of the antenna array may be configured to update one or more of said configuration parameters to effect a corresponding change at one or more of the radiating elements of the antenna array.

The means for re-configuring the radiating configuration of the antenna array may be configured to perform the re-configuring in substantially real-time or near real-time based on the last-received value of the performance metric.

Another aspect may provide a method, comprising: receiving a performance metric for an antenna array comprised of a plurality of radiating elements, the antenna array having a radiating configuration represented by configuration parameters; updating the configuration parameters dependent on the received performance metric by means of estimating new configuration parameters for moving the performance metric towards a target value; and re-configuring the radiating configuration of the antenna array based on the updated configuration parameters such that the physical geometry of the antenna array is changed.

The re-configuring may change the physical geometry by moving one or more radiating elements based on the re-configured configuration.

The method may further comprise iteratively updating the configuration parameters dependent on received performance metrics resulting from the updated configuration parameters, until a stop condition is reached.

The stop condition may correspond to a fixed number of update iterations. The stop condition may correspond to the performance metric reaching the target value. The stop condition may correspond to a fixed number of update iterations for which the performance metric does not move towards the target value.

The updating may comprise using a machine learning model configured to estimate, based on stored training data, updated configuration parameters likely to move the performance metric towards a target value.

The method may further comprise training the machine learning model with data derived from initial connections quality and subsequently updated based on the results caused by the updated configuration parameters. The method may further comprise training the machine learning model with initial configuration parameters and subsequently updating based on the results of re-configurations caused by the updated configuration parameters.

The machine learning model may be trained with data from a digital sibling.

The performance metric may be received from a computing means configured to receive performance data from a physical node of at least part of a communications network with which the antenna array forms part.

The computing means may be associated with a base station of at least part of a cellular communications network with which the antenna array forms part.

The performance metric may be received from a simulation means which simulates a physical node of at least part of a communications network with which the antenna array forms part.

The simulated physical node may be associated a base station of at least part of a cellular communications network with which the antenna array forms part.

The computing or simulation means may comprise a part of the apparatus.

The received performance metric may represent the measured or simulated value of one or more of data throughput, call drop rate, outage probability and energy consumption associated with the antenna array.

The performance metric may represent said measured or simulated values for each of a different number of user equipment within a cell of a cellular communications system associated with the antenna array.

The configuration parameters may comprise one or more of, for a $j^{th}$ radiating element of an $i^{th}$ antenna of the antenna array:

| Position | $x_{i,j} \in \mathbb{P}_{i,j} \subset \mathbb{R}^3$ |
|---|---|
| Azimuth angle | $\varphi_{i,j} \in [0, 2\pi]$ |
| Elevation angle | $\theta_{i,j} \in [-\pi/2, \pi/2]$ |
| Analog phase shift | $\beta_{i,j} \in [-\pi, \pi]$ |
| Analog signal gain | $\alpha_{i,j} \in [\alpha_{min}, \alpha_{max}]$ | and the re-configuring of the radiating configuration of the antenna array may comprise updating one or more of said configuration parameters to effect a corresponding change at one or more of the radiating elements of the antenna array.

The re-configuring of the radiating configuration of the antenna array may comprise performing the re-configuring in substantially real-time or near real-time based on the last-received value of the performance metric.

Another aspect may provide an apparatus comprising at least one, at least one memory directly connected to the at least one processor, the at least one memory including computer program code, and the at least one processor, with the at least one memory and the computer program code being arranged to perform the method of: receiving a performance metric for an antenna array comprised of a plurality of radiating elements, the antenna array having a radiating configuration represented by configuration parameters; updating the configuration parameters dependent on the received performance metric by means of estimating new configuration parameters for moving the performance metric towards a target value; and re-configuring the radiating configuration of the antenna array based on the updated configuration parameters such that the physical geometry of the antenna array is changed.

The at least one processor, with the at least one memory and the computer code are further arranged to perform the method of any above definition connected with the above aspect.

Another aspect may provide a computer program product comprising a set of instructions which, when executed on an apparatus, are configured to cause the apparatus to carry out the method of: receiving a performance metric for an antenna array comprised of a plurality of radiating elements, the antenna array having a radiating configuration represented by configuration parameters; updating the configuration parameters dependent on the received performance metric by means of estimating new configuration parameters for moving the performance metric towards a target value; and re-configuring the radiating configuration of the antenna array based on the updated configuration parameters such that the physical geometry of the antenna array is changed.

Another aspect provides a non-transitory computer readable medium comprising program instructions stored thereon for performing a method, comprising: receiving a performance metric for an antenna array comprised of a plurality of radiating elements, the antenna array having a radiating configuration represented by configuration parameters; updating the configuration parameters dependent on the received performance metric by means of estimating new configuration parameters for moving the performance metric towards a target value; and re-configuring the radiating configuration of the antenna array based on the updated configuration parameters such that the physical geometry of the antenna array is changed.

Another aspect may provide an apparatus comprising: at least one processor; and at least one memory including computer program code which, when executed by the at least one processor, causes the apparatus: to receive a performance metric for an antenna array comprised of a plurality of radiating elements, the antenna array having a radiating configuration represented by configuration parameters; to update the configuration parameters dependent on the received performance metric by means of estimating new configuration parameters for moving the performance metric towards a target value; and to re-configure the radiating configuration of the antenna array based on the updated configuration parameters such that the physical geometry of the antenna array is changed.

Reference to a "means" above may refer to any of hardware, software, electrical or electronic circuitry, or any combination thereof, configured to perform the stated functions.

DRAWINGS

Example embodiments will now be described by way of non-limiting example, with reference to the accompanying drawings, in which.

DETAILED DESCRIPTION

Example embodiments relate to controlling one or more radiating elements, for example of one or more radio frequency antennas. Example embodiments may relate to an apparatus, method and/or computer program for controlling one or more antenna radiating elements (hereafter "radiating elements") of one or more antennas of an antenna array; an antenna array is a physical apparatus which comprises a plurality of distinct antennas. The antennas of the array may work together, effectively as a single antenna, to transmit or receive radio frequency waves. Antenna arrays are used in various fields, for example in cellular communications.

Example embodiments may relate to adaptively controlling the radiating elements of one or more antennas. The adaptive control may be performed in real-time or near real-time to provide on-the-fly modifications to a current antenna array configuration based on, for example, current or very recent conditions, such as network conditions, the number of user equipment in one or more cells associated with the antenna array, and so on. These examples are not to be considered limiting on the scope of the present disclosure and are given merely by way of example. The antenna array configuration may refer to characteristics of individual antennas, and/or characteristics of individual radiating elements thereof, in terms of their phase, gain, and positional characteristics, for example. Modifications to the antenna array configuration may be for the purpose of modifying radiation or receiving characteristics of one or more radiating elements. All or a subset of the radiating elements may be re-configured in this way.

Figure 1:
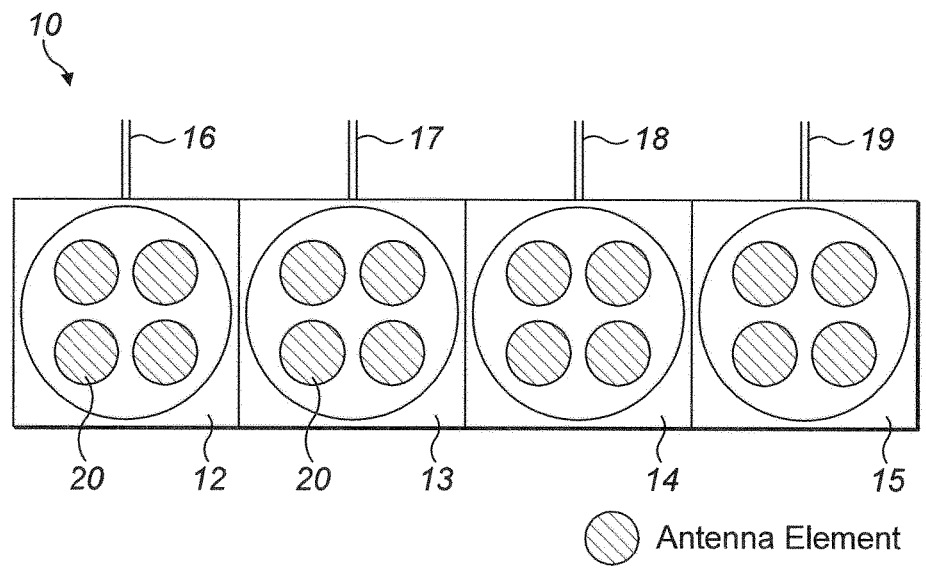
FIG. 1 is a schematic view of an antenna array.

Referring to FIG. 1, an antenna array to is shown in schematic view. The antenna array to comprises a plurality of antennas 12-15. Each of the antennas 12-15 has respective radio frequency inputs and outputs 16-19. Each of the antennas 12-15 may comprise one or more radiating elements 20, which for example may be dipoles, which may be fed by the same radio frequency signal via the radio frequency inputs and outputs 16-19. Each antenna 12-15 may be associated with a respective radio frequency processing chain.

Some characteristics of an antenna array are antenna spacing and total size (relative to the wavelength) which is known as the aperture. The size may determine the directivity of the array, that is its ability to focus radiated energy towards certain directions. The number of antennas may determine the radiated/received energy.

Figure 2:
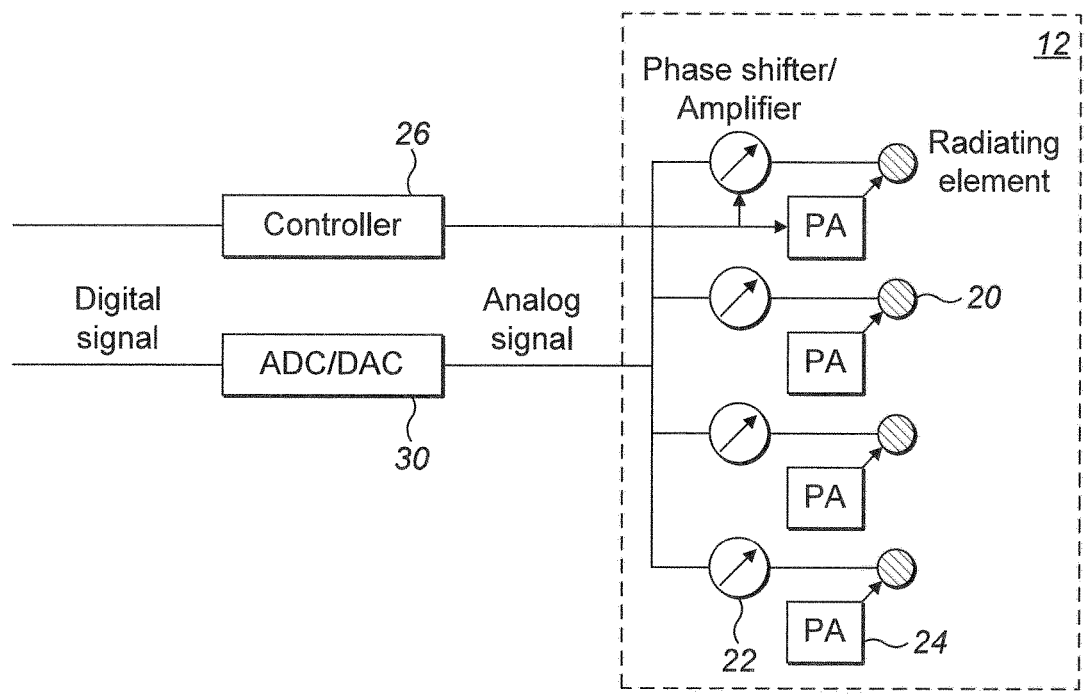
FIG. 2 is a block diagram of a system comprising an antenna array and controller in accordance with example embodiments.

Referring to FIG. 2, the radiating elements 20 of each antenna 12-15 may share in general a single analog-to-digital converter (ADC)/digital-to-analog converter (DAC) 30. However, the phase and amplitude (or gain) of the radio frequency signals of each radiating element 20 can optionally be individually controlled in the analog domain, as indicated by the phase shifter and amplifier elements 22. Phase and amplitude are example characteristics of a given radiating element 20.

In some embodiments, other characteristics of a given radiating element 20 may comprise one or more of position, azimuth angle and elevation angle. For this purpose, mechanical positioning means may be associated with each radiating w element 20. An example mechanical positioning means may comprise a positional actuator 24 ("PA"). A plurality of such actuators 24 may be used, for example linear and/or rotational positional actuators, for modifying one or more of the position, azimuth angle and elevation angles.

Embodiments herein may provide a controller 26 for controlling the configuration of one or more the radiating elements 20 by means of controlling one or more respective phase shifter and amplifier elements 22 and/or positional actuators 24. In FIG. 2, the controller 26 is shown connected to only one such phase shifter and amplifier element 22 and/or positional actuator 24 but it will be appreciated that, in practice, the controller 26 may be connected to each device it is to control.

In overview, example embodiments may involve the controller 26 (or another processing device associated with the controller) receiving a performance metric $L(\Omega)$ for an antenna array to comprised of a plurality of radiating elements 20. The performance metric $L(\Omega)$ may be based on performance data associated with the antenna array to, the antenna array having a radiating configuration represented by configuration parameters. In some embodiments, the configuration parameters may correspond to one or more of the above characteristics of given radiating elements 20. For example, the jth radiating element of the ith antenna of the antenna array to may the following configuration parameters:

| Position | $x_{i,j} \in \mathbb{P}_{i,j} \subset \mathbb{R}^3$ |
| Azimuth angle | $\varphi_{i,j} \in [0, 2\pi]$ |
| Elevation angle | $\theta_{i,j} \in [-\pi/2, \pi/2]$ |
| Analog phase shift | $\beta_{i,j} \in [-\pi, \pi]$ |
| Analog signal gain | $\alpha_{i,j} \in [\alpha_{min}, \alpha_{max}]$ |

The values of the configuration parameters may reflect the settings of individual radiating elements 20 in correspondence to the configuration.

The configuration parameters may be combined into a parameter vector:

$$\omega i,j=[x^T,\phi i,j,\theta i,j,\beta i,j,\alpha i,j]^T \in R^7.$$

The antenna array 10 may have M antennas, where the ith antenna has Ni radiating elements. The set of all configuration parameters of the antenna array 10 may be denoted by $$\Omega=\{\omega i,j:i=1,\ldots,M;j=1,\ldots,Ni\}.$$

Embodiments may also comprise updating the configuration parameters $\Omega$ dependent on the received performance metric $L(\Omega)$, and re-configuring the radiating configuration of the antenna array 10 based on the updated configuration parameters $\tilde{\Omega}^1$. The values of the updated configuration parameters $\tilde{\Omega}^1$ therefore reflect updated settings to be applied to the individual radiating elements 20. This may be achieved for example by one or more of increasing or decreasing the phase shift $ai,j$, the signal gain $ai,j$, and modifying via the positional actuators 24 the position $xi,j$, azimuth angle $\phi i,j$ and elevation angle $\theta i,j$ of the individual radiating elements 20.

The performance metric $L(\Omega)$ may be an arbitrary metric. For example, the performance metric $L(\Omega)$ may be a value representative of data throughput, e.g. cell sum throughput, $5^{th}$ percentile throughput, median throughput or geometric throughput. For example, the performance metric $L(\Omega)$ may be a value representative of one or more of call drop rate, outage probability, energy consumption and so on. One or more of the above examples may be the basis of computing a performance metric $L(\Omega)$, which is a value indicative of performance of the one or more performance characteristics.

By modifying one or more configuration parameters, the performance metric $L(\Omega)$ is likely to change. Therefore, embodiments may involve modifying the one or more configuration parameters $\Omega$ with the aim of moving the performance metric $L(\Omega)$ towards a target. The target may represent an optimal condition, e.g. solving the optimisation problem:

$$\arg\max L(\Omega) \quad (1)$$

but some other target, usually in the direction of improving technical performance, may be used.

In some embodiments, it is proposed to use reinforcement learning (RL) and/or supervised learning (SL) methods to adapt the positions, and/or other controllable characteristics, of the radiating elements 20 with the aim of improving, if not maximising, the performance metric $L(\Omega)$. In this way, embodiments enable changing of the geometry an antenna array 10, on-the-fly, such that it can be automatically improved or optimized for any radio environment, without human interaction. The main benefits are improved performance, as well as reduced capital and ongoing expenditure.

The performance metric $L(\Omega)$ may itself either be computed from measurements based on real data associated with the antenna array 10, or from simulations. The performance metric $L(\Omega)$ may also be available in explicit mathematical form.

Figure 3:
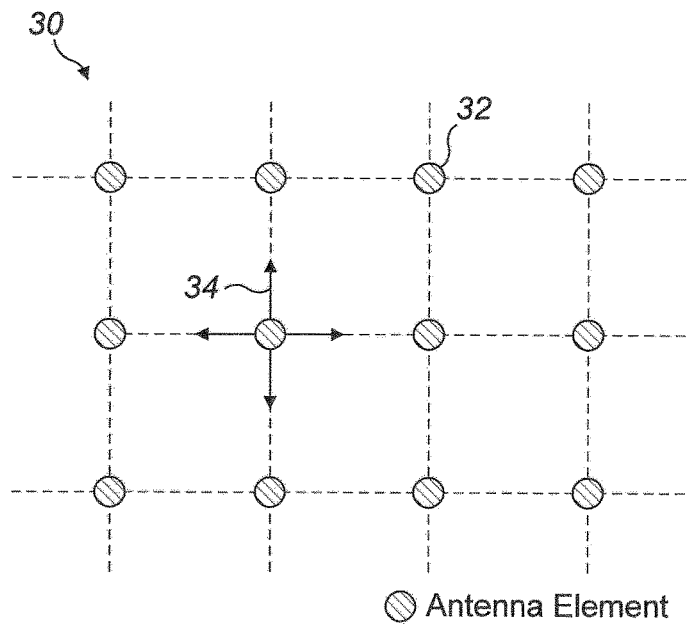
FIG. 3 is a partial schematic view of another antenna array, controllable in accordance with the controller in FIG. 2.

FIG. 3 shows in schematic view part of another antenna array 30 which comprises an antenna having twelve radiating elements 32. As indicated by the arrows 34 shown relative to one such radiating element 32, each radiating element may be moved in terms of position $xi,j$ by an associated positional actuator.

Figure 4:
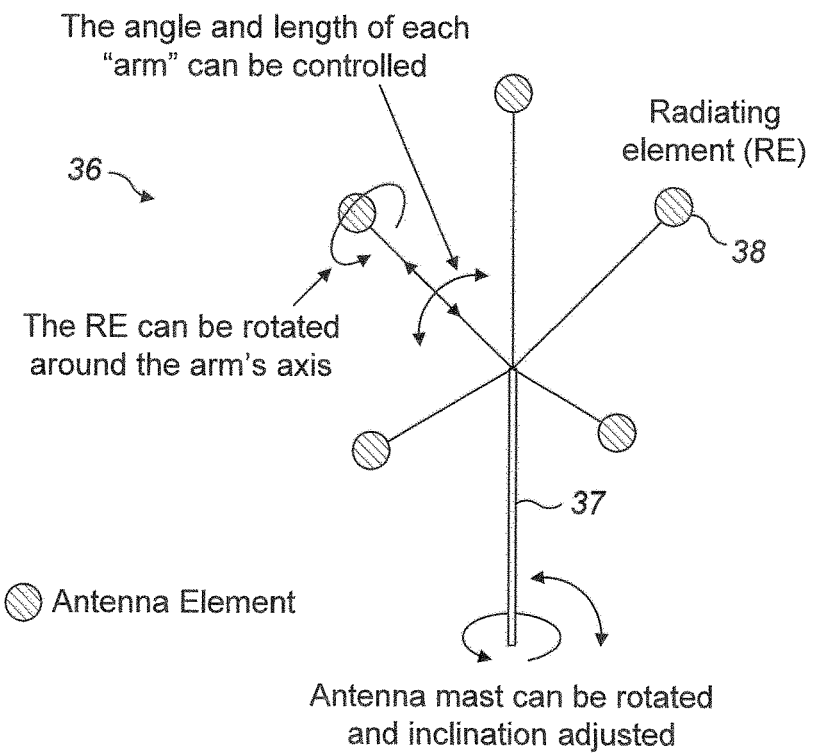
FIG. 4 is a partial schematic view of another antenna array, controllable in accordance with the controller in FIG. 2.

FIG. 4 shows in perspective view part of another antenna array which may comprise an antenna 36 comprising a mast 37 and a plurality of radiating elements 38 extending therefrom. As indicated, the mast 37 may be rotated by a positional actuator, and each radiating element 38 may be modified in terms of angle with respect to the mast, the length of each arm and rotation about its own axis.

Figure 5:
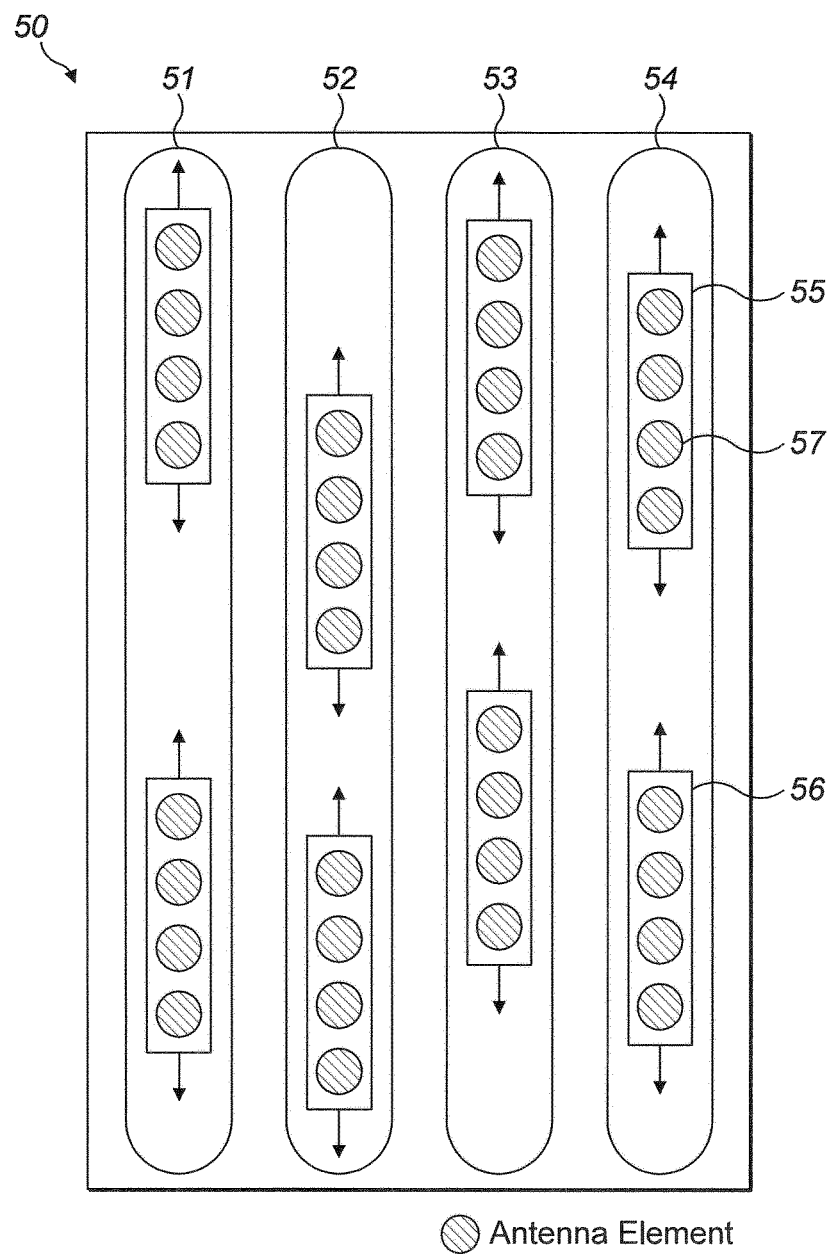
FIG. 5 is a partial schematic view of another antenna array, controllable in accordance with the controller in FIG. 2.

FIG. 5 shows in top plan view part of another antenna array 50, particularly a planar antenna array, which comprises four antenna columns 51-54, each comprising two blocks 55, 56 of four antennas or radiating elements 57. As indicated by the arrows, the vertical position of each block 55, 56 of each antenna column 51-54 may be controllably moved. In another embodiment, the horizontal position of each block 55, 56 may be controllable, either additionally or alternatively. The controllable movement may be by means of any method described above.

A controllable antenna array according to example embodiments may combine two or more of the FIG. 3-FIG. 4 characteristic modifications, whether wholly or in part.

There will now be described examples of how control is achieved.

In overview, control may be performed using hardware, software or a combination thereof.

Figure 6:
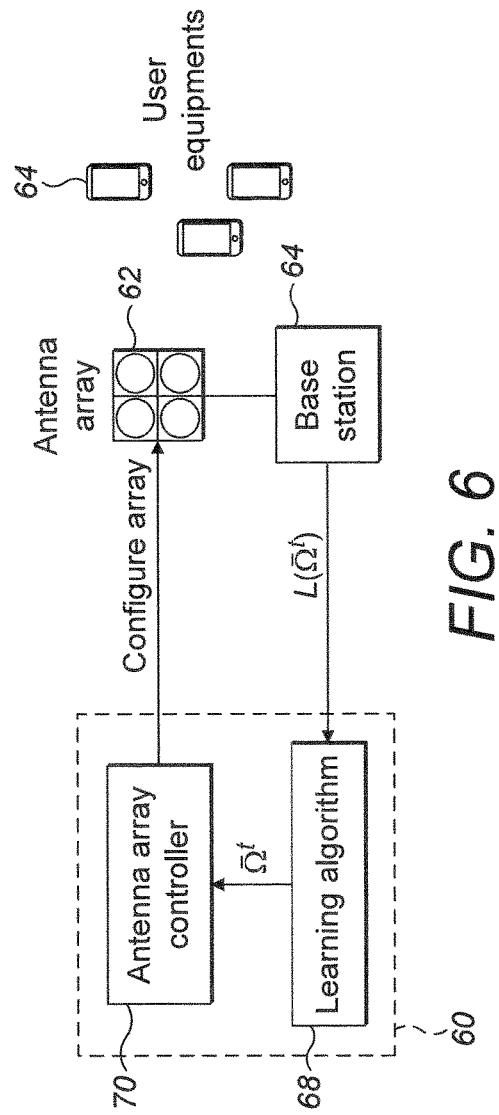
FIG. 6 is a block diagram of a further system comprising an antenna array and controller in accordance with example embodiments.

FIG. 6 is a block diagram showing functional modules of a controller 60, which is shown in association with an antenna array 62 and connected base station 64. The base station 64 may for example be a cellular base station, commonly referred to as a nodeB (NB), enhanced nodeB (eNB) or next-generation nodeB (gNB) depending on the standard used, although present embodiments are not standard specific. The base station 64 may be associated with a cell of a cellular communications network within which may be located a plurality of user equipments 66. The controller 60 may comprise a learning algorithm module 68 and an antenna array controller 70.

The learning algorithm may be configured to produce an antenna array configuration $\tilde{\Omega}^t$ which is subsequently applied to the antenna array 62 through the antenna array controller 70.

The base station may be configured to measure the performance metric $L(\tilde{\Omega}^t)$, for example the throughput achieved by the user equipments 66 within its cell, which is subsequently forwarded to the learning algorithm 68, which in turn is configured to produce an updated antenna configuration and so on which re-configures the characteristics of the antenna array 62.

Figure 8:
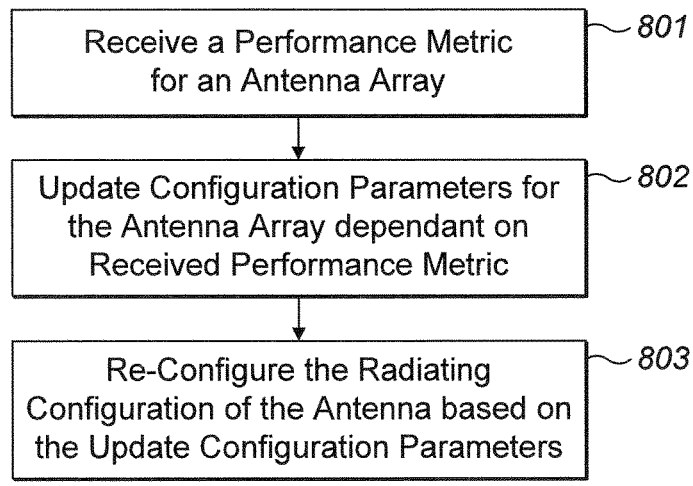
FIG. 8 is a flow diagram showing operations that may be performed in accordance with example embodiments.

FIG. 8 is a flow diagram showing processing operations of a generalised method of example embodiments. A first operation 801 comprises receiving a performance metric for an antenna array. The performance metric may be received from a remote node, such as from a base station such as the base station 64. A second operation 802 comprises updating configuration parameters for the antenna array 62 dependent on the received performance metric. A third operation 803 comprises re-configuring the radiating configuration of the antenna based on the updated configuration parameters.

Figure 9:
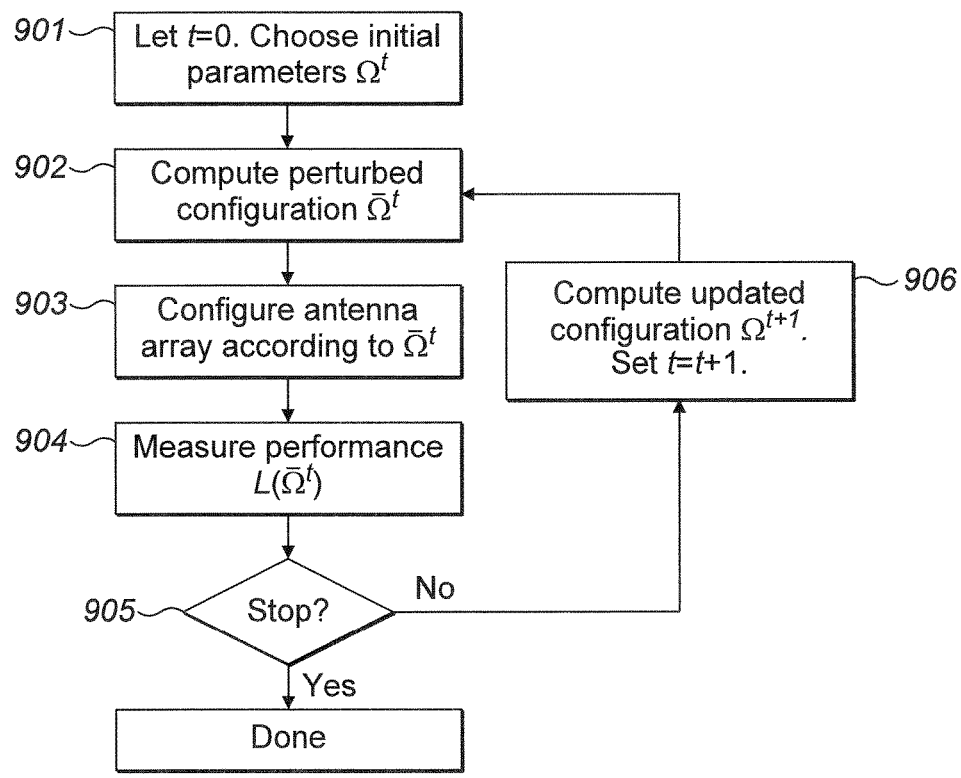
FIG. 9 is a further flow diagram showing operations that may be performed in accordance with example embodiments.

A more specific, but still general learning algorithm which works for any performance metric $L(\Omega)$ will now be described, relating to the high-level view provided in FIG. 6. A corresponding flowchart, which may represent processing operations, is provided in FIG. 9 which is now referred to. The reference numerals are not necessarily indicative of processing order.

In a first operation 901, we let t=0 and choose a set of initial parameters $\Omega^t$.

In another operation 902 we compute a perturbed configuration $\tilde{\Omega}^t$. For example, for i=1, ..., M, j=1, ..., $N_i$, a random vector $\varepsilon i,j$ may be drawn from some distribution $p(\varepsilon)$. For example, $p(\varepsilon)$ could be a multivariate normal distribution with zero mean and a fixed covariance matrix $\sigma^2 I$, i.e., $p(\varepsilon)=N(0, \sigma^2 I)$. We could also have a different distribution $p i,j (\varepsilon)$ for each radiating element of the antenna array 62.

In another operation 903, the antenna array 62 may be configured according to:

$$\tilde{\omega}^t_{i,j}=\omega^t_{i,j}+\varepsilon i,j, i=1,\ldots,M, j=1,\ldots,N_i. \quad (2)$$

This defines the parameters $\tilde{\Omega}^t$.

In another operation 904, the performance metric $L(\tilde{\Omega}^t)$ is computed, e.g. measured.

In another operation 905, it is determined if a stop condition is reached. If not, another operation 906 may comprise computing parameter updates according to:

$$\omega_{i,j}^{t+1}=\omega_{i,j}^t+\eta L(\tilde{\Omega}^t)\nabla_{\omega_{i,j}^t}\log(p(\tilde{\omega}_{i,j}^t|\omega_{i,j}^t)),$$
$$i=1,\ldots,M, j=1,\ldots N_i \quad (3)$$

for some learning rate $\eta>0$. For $p(\varepsilon)=N(0, \sigma^{-2}I)$, this boils down to:

$$\omega_{i,j}^{t+1} = \omega_{i,j}^t + \eta L(\tilde{\Omega}^t)\frac{(\omega_{i,j}^t - \tilde{\omega}_{i,j}^t)}{\sigma^2} \quad (4)$$

In the same or a different operation, the value of t is updated to +1, and the process may return to operation 902.

The initial antenna array configuration $\Omega^t$ may be obtained from simulations. In this case, the performance metric $L(\Omega)$ is not measured from a real-world system, e.g. data received from the antenna array 62, but simulated on a computer. Having good initialization is helpful to speed-up the learning process. However, it is only optional and not required for realizing embodiments herein.

In some embodiments, if the updated parameter vectors $\omega^{t+1}$ or $\tilde{\omega}^{t+1}$ are determined to comprise non-feasible values, for example if they correspond to a radiating element position that is not physically possible, the parameter vectors may be projected back to a set of feasible parameter vectors. For example, entries of the vector may be clipped to certain minimum and/or maximum values.

Alternatively, the learning rate q may be adjusted such that i, j remains feasible.

In some embodiments, operations 903 and 904 may be run multiple times to compute performance metrics for different perturbations of the same antenna configuration. In this case, the gradient computed in operation 906 may be averaged over these values.

In operation 906, the learning-rate $\eta$ may be computed and adapted by any stochastic gradient descent (SGD) algorithm, e.g., ADAM, RMSProp, Momentum, to give some examples.

The stop criterion in operation 905 may take multiple forms. For example, the process may stop after a fixed number of training iterations, or stop when $L(\tilde{\Omega}^t)$ has not improved during a fixed number of iterations, or stop when $L(\tilde{\Omega}^t)$ has reached a desired value. In some embodiments, there may be no stop operation 905, i.e. the training may run indefinitely.

The second term of equation (3) is also known as the policy gradient. Various methods to improve the convergence speed of this algorithm exist in the (deep) learning literature, see, e.g. R. S. Sutton, D. McAllester, S. Singh, and Y. Mansour, Policy gradient methods for reinforcement learning with function approximation, Proceedings of the 12th International Conference on Neural Information Processing Systems, NIPS, pages 1057-1063, Cambridge, Mass., USA, 1999. MIT Press.

A learning algorithm for an differentiable performance metric $L(\Omega)$ will now be described.

In some cases, the gradient $\nabla_{\omega i,j} L(\Omega)$ may be explicitly calculated. This may be the case when $L(\Omega)$ is either computed analytically/numerically or through simulations.

Figure 10:
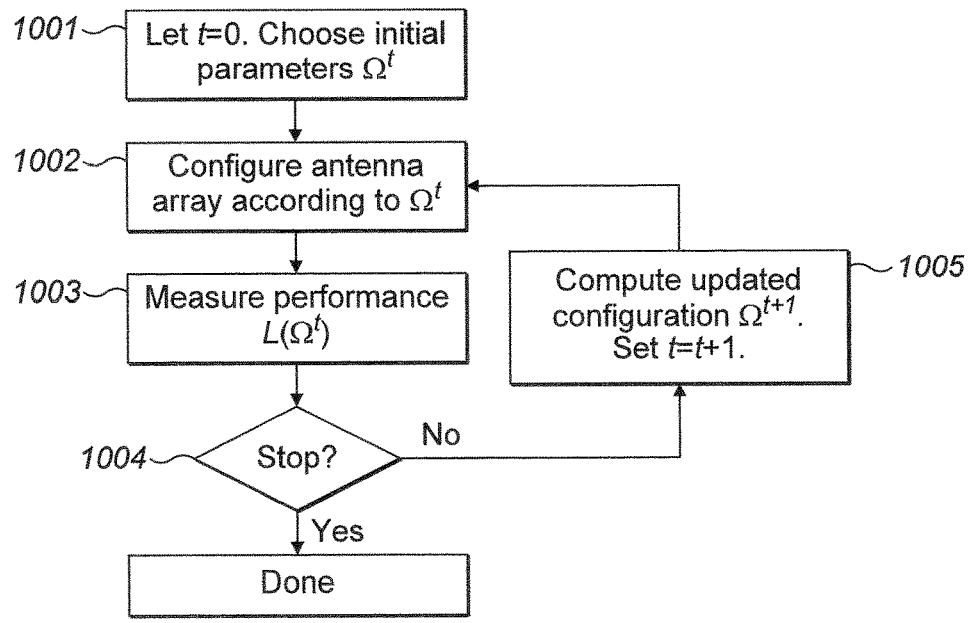
FIG. 10 is a further flow diagram showing operations that may be performed in accordance with example embodiments.

Referring to the flow diagram of FIG. 10, processing steps will now be described by way of example. Note that other numerical optimization algorithms can be used in this case.

In a first operation 1001, we let t=0 and choose a set of initial parameters $\Omega^t$.

In another operation 1002, we configure the antenna array 62 according to $\Omega^t$.

In another operation 1003, we computer the performance metric $L(\Omega^t)$.

In another operation 1004, it is determined if a stop condition is reached. If not, another operation 1005 may comprise computing parameter updates according to:

$$\omega_{i,j}^{t+1}=\omega_{i,j}^t+\eta\nabla_{\omega_{i,j}^t}L(\Omega^t), i=1,\ldots,M, j=1,\ldots N_i \quad (5)$$

for a learning rate $\eta>0$.

In the same or a different operation, the value of t is updated to and the process may return to operation 1002.

Similar to some other embodiments, if the updated parameter vectors $\omega^{t+1}$ or $\tilde{\omega}^{t+1}$ are determined to comprise non-feasible values, for example if they correspond to a radiating element position that is not physically possible, the parameter vectors may be projected back to a set of feasible parameter vectors. For example, entries of the vector may be clipped to certain minimum and/or maximum values.

The learning-rate $\eta$ may be computed and adapted by any stochastic gradient descent (SGD) algorithm, e.g., ADAM, RMSProp, Momentum, to give some examples.

In some embodiments, operations 1002 and 1003 may be run multiple times to compute performance metrics for different perturbations of the same antenna configuration. In this case, the gradient computed in operation 1006 may be averaged over these values.

Figure 7:
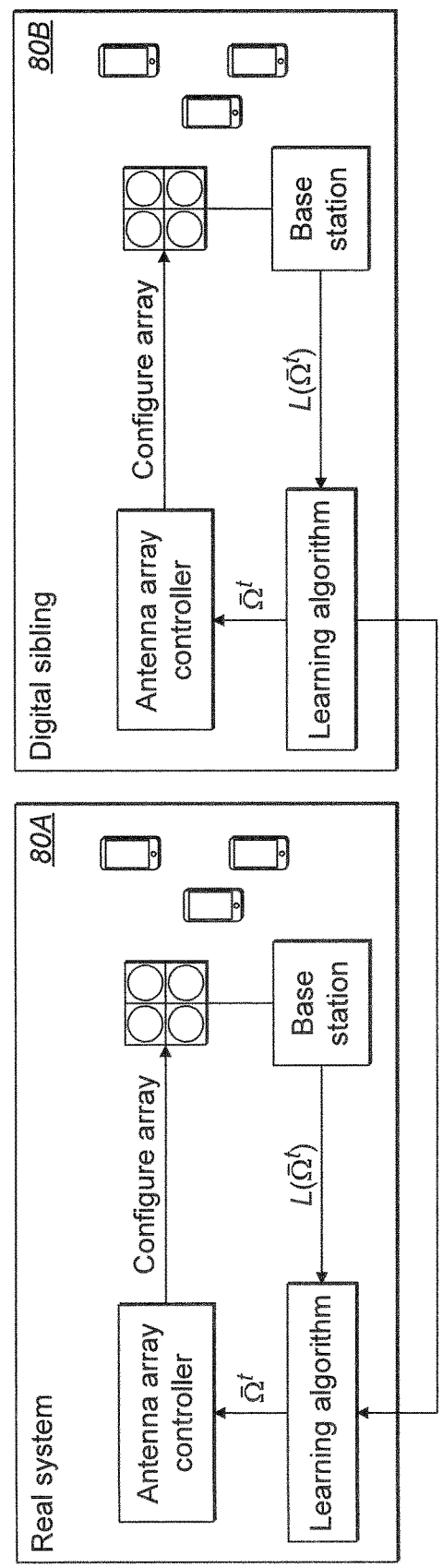
FIG. 7 is a block diagram showing a real control system and digital sibling system for use in accordance with example embodiments.

In some embodiments, the above-mentioned initial configuration of the antenna array 62 can be obtained by simulation. That is, the algorithms described above may be used to find parameters $\Omega$ through simulations which are then used as initial parameters $\Omega^o$ for the algorithm running on a real system. This is schematically shown in FIG. 7, comprising a real system 80A, for example that shown in FIG. 6, and a digital sibling system 80B, a term widely used to mean a realistic simulator of a system that it is desired to improve or optimise. A digital sibling system 80B may run simulations faster than real-time and significantly increase the speed of the training process. In other embodiments, initial parameters from another base station may be used, sometimes referred to as "transfer learning."

So far, the antenna configuration parameters are optimized with respect to a given performance metric $L(\Omega^t)$. However, it may be possible that there are other parameters $s\in R^P$ which should be explicitly taken into account. These parameters may comprise, for example, the number of user equipments 66 in a cell, the time of the day, weather conditions, etc.

In some examples, a goal is to find a mapping $\Omega=f(s)$ from these additional parameters to the optimal antenna array configuration that maximizes the performance metric $L(\Omega,s)$.

In this case, we may assume that the function $f$ has tunable parameters $\mu$, i.e., $f(s)=f\mu(s)$, and we would like to solve the optimization problem:

$$\arg\max_{\mu} L(f\mu(s),s). \quad (6)$$

Figure 11:
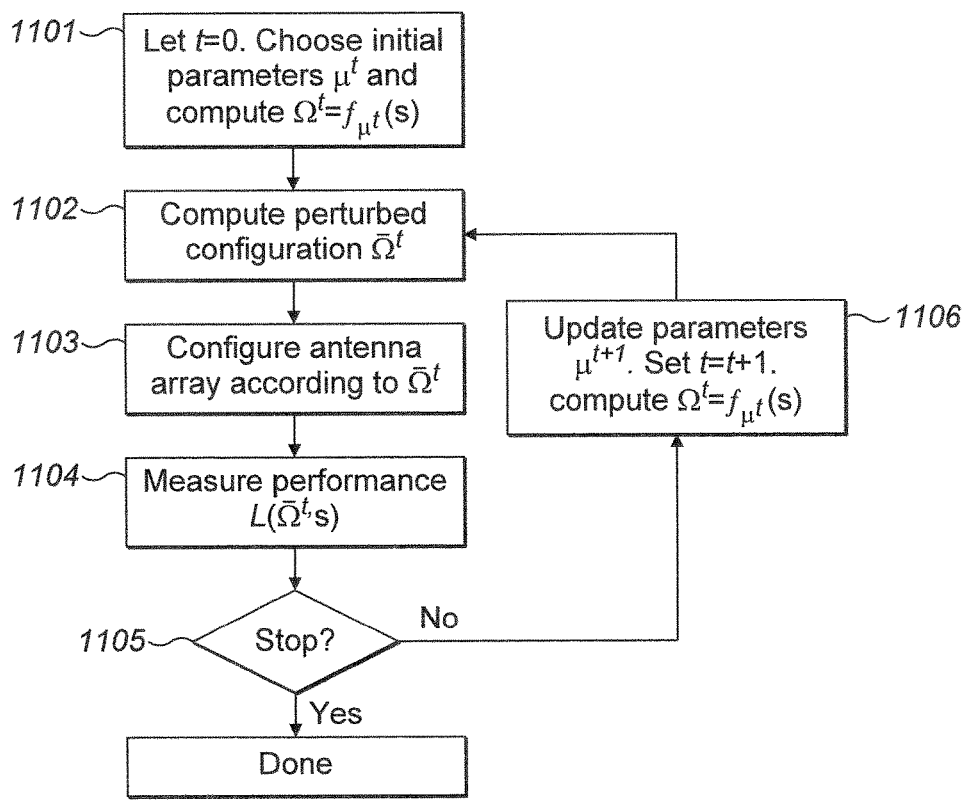
FIG. 11 is a further flow diagram showing operations that may be performed in accordance with example embodiments.

We may obtain the following algorithm for non-differentiable performance metrics $L(f\mu(s), s)$. A flow diagram showing processing operations in this case is shown in FIG. 11.

In a first operation 1101, we let t=0 and choose a set of initial parameters $\mu^t$. We also compute $\Omega^t=f\mu t(s)$.

In another operation 1102, we compute a perturbed configuration $\tilde{\Omega}^t$. This may comprise taking the parameters s and computing $\Omega^t=f\mu t(s)$. For i=1, ..., M, j=1, ..., Ni, we may draw a random vector $\varepsilon_{i,j}$ from some distribution $p(\varepsilon)$. For example, $p(\varepsilon)$ could be a multivariate normal distribution with zero mean and fixed covariance matrix $\sigma^2 I$, i.e., $p(\varepsilon)=N(0, \sigma^2 I)$. We may also have a different distribution $p_{i,j}(\varepsilon)$ for each radiating element of the antenna array.

In another operation 1103, we may configure the antenna array 62 according to:

$$\tilde{\omega}_{i,j}^t=\omega_{i,j}^t+\varepsilon_{i,j}, i=1,\ldots,M, j=1,\ldots N_i \quad (7)$$

This defines the parameters $\tilde{\Omega}^t$.

In another operation 1104, the performance metric $L(\tilde{\Omega}^t)$ is computed, e.g. measured.

In another operation 1105, it is determined if a stop condition is reached. If not, another operation 1106 may comprise computing parameter updates according to:

$$\mu^{t+1}=\mu^t+\eta L(\tilde{\Omega}^t,s)\nabla_\mu^2 \log(p(\tilde{\omega}_{i,j}^t|\omega_{i,j}^t)),$$
$$i=1,\ldots,M, j=1,\ldots N_i \quad (8)$$

for a learning rate $\eta>0$.

In the same or a different operation, the value of t is updated to t+1, and the process may return to operation 1102.

In some embodiments, operations 1103 and 1104 may be run multiple times to compute performance metrics for different perturbations of the same antenna configuration. In this case, the gradient computed in operation 1106 may be averaged over these values.

Figure 12:
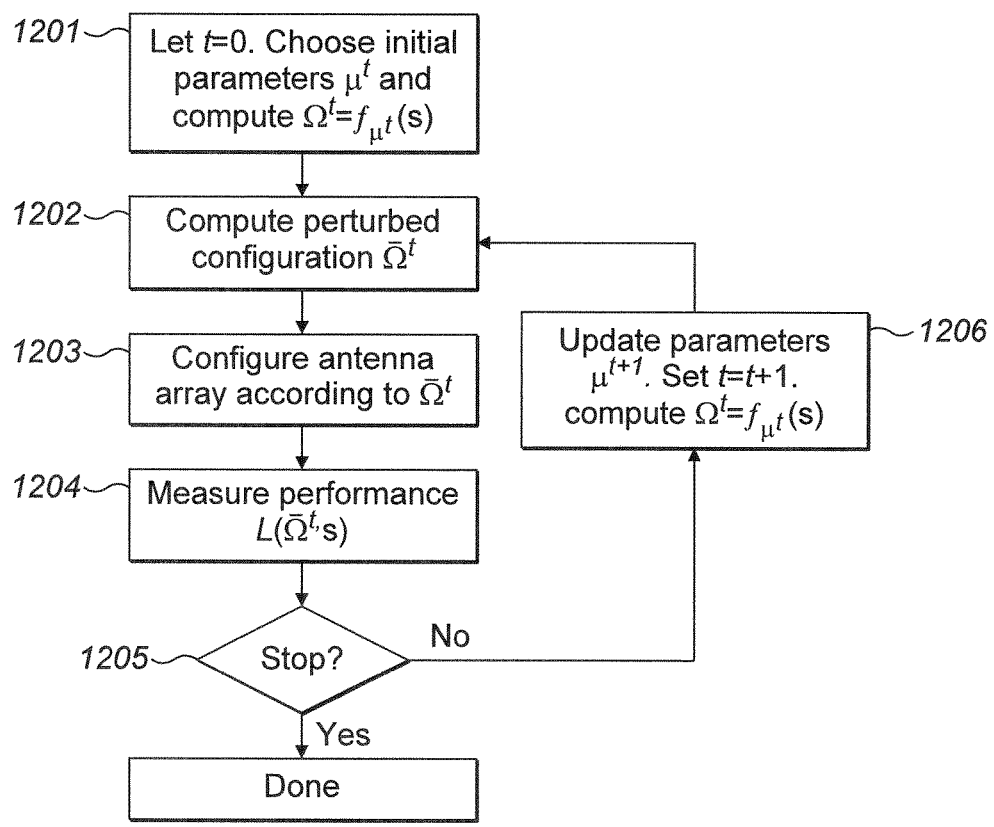
FIG. 12 is a further flow diagram showing operations that may be performed in accordance with example embodiments.
Figure 13:
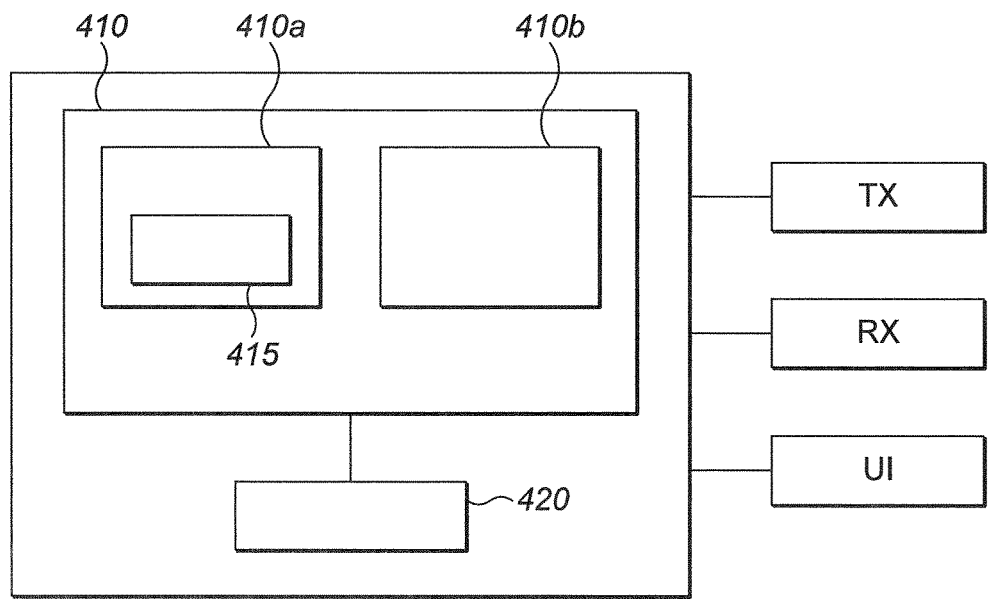
FIG. 13 is a block diagram showing components of the FIG. 2 or FIG. 6 in accordance with example embodiments.

For differentiable performance metrics $L(f\mu(s), s)$ we propose the following method, the processing operations of which are shown in FIG. 12.

In a first operation 1201, we let t=0 and choose a set of initial parameters $\mu^t$. We also compute $\Omega^t=f\mu t(s)$.

In another operation 1202, we compute a perturbed configuration $\tilde{\Omega}^t$. This may comprise taking the parameters s and computing $\Omega^t=f\mu t(s)$.

In another operation 1203, we may configure the antenna array 62 according to $\Omega^t=f\mu t(s)$.

In another operation 1204, we may compute performance metric $L(\Omega^t,s)$.

In another operation 1205, it is determined if a stop condition is reached. If not, another operation 1206 may comprise computing parameter updates according to:

$$\mu^{t+1}=\mu^t+\eta\nabla_{\mu_{i,j}}L(\Omega^t,s), i=1,\ldots,M, j=1,\ldots N_i \quad (9)$$

for a learning rate $\eta>0$.

In the same or a different operation, the value of t is updated to t+1, and the process may return to operation 1202.

In some embodiments, operations 1203 and 1204 may be run multiple times to compute performance metrics for different perturbations of the same antenna configuration. In this case, the gradient computed in operation 1206 may be averaged over these values.

In some embodiments, the mapping $f\mu(s)$ may be performed using a neural network (NN) and $\mu$ may denote its trainable parameters, e.g., its weights and/or biases.

In some embodiments, if the updated parameter vectors $\omega^{t+1}$ or $\tilde{\omega}^{t+1}$ are determined to comprise non-feasible values, for example if they correspond to a radiating element position that is not physically possible, the parameter vectors may be projected back to a set of feasible parameter vectors. For example, entries of the vector may be clipped to certain minimum and/or maximum values. Alternatively, the learning rate $\eta$ can be adjusted such that $\omega^{t+1}$ always remains feasible. Another way is to "punish" the learning system may be by feedback of a predefined negative loss when a non-feasible setting is chosen, so that by minimizing the loss, the systems "learns" to avoid such configurations.

The learning algorithm may employ a machine learning model, which may be initialised with data derived from initial connections quality, e.g. signal quality, and subsequently updated based on the results caused by the updated configuration parameters. The machine learning model in other embodiments may be initialised with initial configuration parameters.

Figure 14:
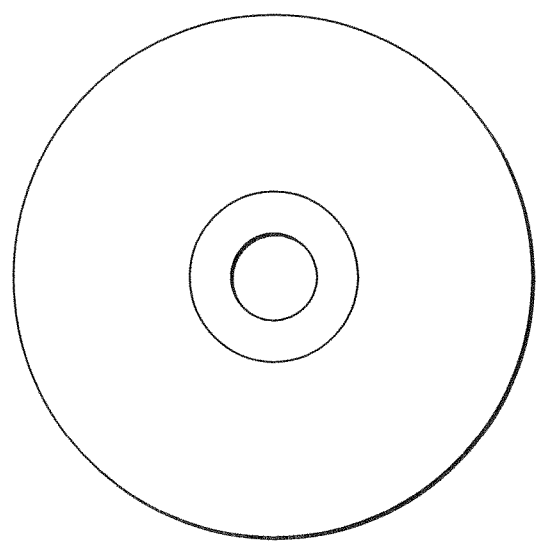
FIG. 14 shows a non-volatile media according to some embodiments.

FIG. 14 shows an apparatus according to an embodiment. The apparatus may provide the controller functionality shown in FIG. 2 and/or the control functionality shown in FIG. 60. The apparatus comprises at least one processor 420 and at least one memory 410 directly or closely connected to the processor. The memory 410 includes at least one random access memory (RAM) 410b and at least one read-only memory (ROM) 410a. Computer program code (software) 415 is stored in the ROM 410a. The apparatus may be connected to a TX path, for example to the antenna array 62, and a RX path, for example from the base station 64 in order to transmit configuration data and receive the performance metric along respective paths. The apparatus may be connected with a user interface UI for instructing the apparatus and/or for outputting results. The at least one processor 420, with the at least one memory 410 and the computer program code 415 may be arranged to cause the apparatus to at least perform at least the method according to one or more of FIGS. 9 to 12.

FIG. 15 shows a non-transitory media according to some embodiments. The non-transitory media is a computer readable storage medium. It may be e.g. a CD, a DVD, a USB stick, a blue ray disk, etc. The non-transitory media stores computer program code causing an apparatus to perform the method of one or more of FIGS. 9 to 12 when executed by a processor such as processor 420 of the apparatus of FIG. 14.

The memory may be volatile or non-volatile. It may be e.g. a RAM, SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
at least one processor; and
at least one memory including computer program code which, when executed by the at least one processor, causes the apparatus to perform acts comprising:
receiving a performance metric for an antenna array comprised of a plurality of radiating elements, the antenna array having a radiating configuration represented by configuration parameters;
automatically updating the configuration parameters to adapt to real-time network conditions dependent on the received performance metric by estimating new configuration parameters for moving the performance metric towards a target value, wherein the updating of the configuration parameters comprises estimating, using a machine learning model based on stored training data, updated configuration parameters likely to move the performance metric towards the target value, and wherein the machine learning model is trained with data derived from initial connections quality and subsequently updated based on the results caused by the updated configuration parameters, or with initial configuration parameters and subsequently updated based on the results of re-configurations caused by the updated configuration parameters; and
re-configuring the radiating configuration of the antenna array based on the updated configuration parameters such that a physical geometry of the antenna array is changed.

2. The apparatus of claim 1, wherein the re-configuring the radiating configuration comprises changing the physical geometry by moving one or more radiating elements based on the re-configured configuration.

3. The apparatus of claim 1, wherein the updating the configuration parameters comprises iteratively updating the configuration parameters dependent on received performance metrics resulting from the updated configuration parameters, until a stop condition is reached, wherein the stop condition comprises one of a fixed number of update iterations, the performance metric reaching the target value, a fixed number of update iterations for which the performance metric does not move towards the target value.

4. The apparatus of claim 1, wherein the machine learning model comprises a learning algorithm and the learning algorithm comprises:
choosing an initial set of configuration parameters;
computing a perturbed configuration of the initial set of configuration parameters;
configuring the antenna array according to the perturbed configuration;
measuring the performance metric; and
determining whether a stop condition is reached.

5. The apparatus of claim 1, wherein the machine learning model is trained using a digital sibling.

6. The apparatus of claim 1, wherein the performance metric is received from a computing processor configured to receive performance data from a physical node of at least part of a communications network with which the antenna array forms part.

7. The apparatus of claim 6, wherein the computing processor is associated with a base station of at least part of a cellular communications network with which the antenna array forms part.

8. The apparatus of claim 1, wherein the performance metric is received from a simulator which simulates a physical node of at least part of a communications network with which the antenna array forms part.

9. The apparatus of claim 8, wherein the simulated physical node is associated a base station of at least part of a cellular communications network with which the antenna array forms part.

10. The apparatus of claim 8, wherein the computing processor or the simulator comprises a part of the apparatus.

11. The apparatus of claim 1, wherein the received performance metric represents the measured or simulated value of one or more of data throughput, call drop rate, outage probability and energy consumption associated with the antenna array.

12. The apparatus of claim 11, wherein the performance metric represents said measured or simulated values for each of a different number of user equipment within a cell of a cellular communications system associated with the antenna array.

13. The apparatus of claim 1, wherein the configuration parameters comprise one or more of, for a $j^{th}$ radiating element of an $i^{th}$ antenna of the antenna array:

| Position | $x_{i,j} \in \mathbb{F}_{i,j} \subset \mathbb{R}^3$ |
| Azimuth angle | $\varphi_{i,j} \in [0, 2\pi]$ |
| Elevation angle | $\theta_{i,j} \in [-\pi/2, \pi/2]$ | and re-configuring the radiating configuration of the antenna array comprises updating one or more of said configuration parameters to effect a corresponding change at one or more of the radiating elements of the antenna array.

14. The apparatus of claim 1, wherein the re-configuring the radiating configuration of the antenna array comprises performing the re-configuring in substantially real-time or near real-time based on the last-received value of the performance metric.

15. A method, comprising:
receiving a performance metric for an antenna array comprised of a plurality of radiating elements, the antenna array having a radiating configuration represented by configuration parameters;
automatically updating the configuration parameters to adapt to real-time network conditions dependent on the received performance metric by estimating new configuration parameters for moving the performance metric towards a target value, wherein the updating of the configuration parameters comprises estimating, using a machine learning model based on stored training data, updated configuration parameters likely to move the performance metric towards the target value, and wherein the machine learning model is trained with data derived from initial connections quality and subsequently updated based on the results caused by the updated configuration parameters, or with initial configuration parameters and subsequently updated based on the results of re-configurations caused by the updated configuration parameters; and re-configuring the radiating configuration of the antenna array based on the updated configuration parameters such that a physical geometry of the antenna array is changed.

16. The method of claim 15, wherein the re-configuring comprises changing the physical geometry by moving one or more radiating elements based on the re-configured configuration.

17. The method of claim 15, further comprising iteratively updating the configuration parameters dependent on received performance metrics resulting from the updated configuration parameters, until a stop condition is reached.

18. A non-transitory computer readable medium comprising program instructions stored thereon for performing a method, comprising:

receiving a performance metric for an antenna array comprised of a plurality of radiating elements, the antenna array having a radiating configuration represented by configuration parameters;

automatically updating the configuration parameters to adapt to real-time network conditions dependent on the received performance metric by estimating new configuration parameters for moving the performance metric towards a target value, wherein the updating of the configuration parameters comprises estimating, using a machine learning model based on stored training data, updated configuration parameters likely to move the performance metric towards the target value, and wherein the machine learning model is trained with data derived from initial connections quality and subsequently updated based on the results caused by the updated configuration parameters, or with initial configuration parameters and subsequently updated based on the results of re-configurations caused by the updated configuration parameters; and re-configuring the radiating configuration of the antenna array based on the updated configuration parameters such that a physical geometry of the antenna array is changed.

\* \* \* \* \*